US012659918B2

(12) United States Patent
Miller et al.

(10) Patent No.: US 12,659,918 B2
(45) Date of Patent: Jun. 16, 2026

---

(54) LOCATION BASED ATTESTATION

(71) Applicant: International Business Machines Corporation, Armonk, NY (US)

(72) Inventors: Grant Douglas Miller, Arvada, CO (US); Christopher J. Giblin, Zurich (CH); Nader M. Nassar, Yorktown Heights, NY (US); Bryan Jon Kyle, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 17/708,013

(22) Filed: Mar. 30, 2022

(65) Prior Publication Data

US 2023/0319775 A1 Oct. 5, 2023

(51) Int. Cl.
*H04W 64/00* (2009.01)
*H04L 9/40* (2022.01)
(Continued)

(52) U.S. Cl.
CPC ....... *H04W 64/003* (2013.01); *H04L 63/0876* (2013.01); *H04L 63/107* (2013.01); *H04W 12/02* (2013.01); *H04W 12/08* (2013.01)

(58) Field of Classification Search
None
See application file for complete search history.

(56) References Cited

U.S. PATENT DOCUMENTS 9,210,150 B2 12/2015 Grim
9,967,713 B2 5/2018 Buchheim
(Continued)

FOREIGN PATENT DOCUMENTS

CN 106101995 A 11/2016
EP 3319241 A1 5/2018
(Continued)

OTHER PUBLICATIONS

"Patent Cooperation Treaty PCT Notification of Transmittal of the International Search Report and the Written Opinion of the International Searching Authority, or the Declaration", Applicant's file reference PF230127PCT, International application No. PCT/CN2023/084650, International filing date Mar. 29, 2023, Date of Mailing Jun. 13, 2023, 7 pages.

(Continued)

*Primary Examiner* — German Viana Di Prisco
(74) *Attorney, Agent, or Firm* — Scott Dobson

(57) ABSTRACT

A computer implemented method for managing access requests based on user device location includes receiving a user initiated access request from a first device of the user, receiving location data of the first device, requesting attestation of a registered device of the user from a trusted geocoded device, receiving an attestation token for the registered device of the user from the trusted geocoded device, wherein the attestation token includes location data for the registered device, comparing the received location data of the first device to the location data of the registered device, and issuing an authentication status based on the comparison of the received location data of the first device to the determined location data of the second device of the user. A computer program product and computer system corresponding to the method are also disclosed.

16 Claims, 4 Drawing Sheets

(51) Int. Cl.
  *H04W 12/02* (2009.01)
  *H04W 12/08* (2021.01)

(56) References Cited

U.S. PATENT DOCUMENTS

| | | | |
|---|---|---|---|
| 10,028,081 B2 | 7/2018 | Scanlon | |
| 10,499,210 B2 | 12/2019 | Chowdhury | |
| 10,645,069 B2 | 5/2020 | Siddiqui | |
| 11,145,147 B2 | 10/2021 | De La Garza | |
| 2005/0066179 A1* | 3/2005 | Seidlein | G06Q 20/4014 |
| | | | 713/182 |
| 2008/0070593 A1 | 3/2008 | Altman | |
| 2008/0209515 A1 | 8/2008 | Ibrahim | |
| 2009/0112967 A1 | 4/2009 | Amano | |
| 2010/0130233 A1 | 5/2010 | Parker | |
| 2011/0302641 A1* | 12/2011 | Hald | G06F 21/35 |
| | | | 726/7 |
| 2014/0068723 A1 | 3/2014 | Grim | |
| 2015/0302409 A1 | 10/2015 | Malek | |
| 2017/0111762 A1* | 4/2017 | Arunkumar | H04W 12/64 |
| 2017/0316359 A1 | 11/2017 | Amin | |
| 2018/0083981 A1* | 3/2018 | Arunkumar | H04L 67/10 |
| 2018/0338219 A1 | 11/2018 | Chowdhury | |
| 2020/0380506 A1* | 12/2020 | Chang | H04L 63/0876 |
| 2021/0168455 A1* | 6/2021 | Campbell | H04L 9/3213 |
| 2022/0116404 A1* | 4/2022 | Manasse | H04L 63/1433 |

FOREIGN PATENT DOCUMENTS

| | | |
|---|---|---|
| GB | 2564317 A | 1/2019 |
| JP | 2005099018 A | 4/2005 |
| WO | 2023/185913 A1 | 10/2023 |

OTHER PUBLICATIONS

Alqahtani et al., "BF2FA: Beacon Frame Two-factor Authentication", 2020 IEEE International Conference on Communication, Networks and Satellite (Comnetsat), pp. 357-361.

Hsieh et al., "Design of a Time and Location Based One-Time Password Authentication Scheme", 2011 7th International Wireless Communications and Mobile Computing Conference, pp. 201-206.

Jansen et al., "A Location-Based Mechanism for Mobile Device Security", 2009 World Congress on Computer Science and Information Engineering, pp. 99-104 , DOI 10.1109/CSIE.2009.719.

Nisar, Farhan, "Location based Authentication Service using 4G/5G Devices", 2019 International Conference on Communication Technologies (ComTech 2019), pp. 120-126.

* cited by examiner

200

START

210   Receive an access request by a user using a mobile device

220   Receive location data of the mobile device

230   Determine a location of a registered device of the user

240   Compare the received location data to the determined location

250   Allow access request

END

LOCATION BASED ATTESTATION

BACKGROUND

The present invention relates generally to the field of location verification, and more specifically to allowing data access on the basis of location attestation.

Many internet services require user authentication before the user is allowed access to services or resources. For example, a common user authentication methodology includes verifying user credentials, such that the user supplies previously established credentials to the service provider, and the provider subsequently authenticates the user based on matching the provided credentials to a record kept by the service provider. Utilizing single factor authentication in this manner can ultimately be inadequate for preventing unauthorized access to data and other resources; in such scenarios, multi-factor authentication may be utilized to further secure access to the restricted content. Multi-factor authentication (MFA) is an authentication method that requires the user to provide two or more verification factors to gain access to a resource. Generally, authentication is directed towards proving an agent is who they claim to be, whereas authorization is directed towards determining whether an agent is permitted to perform an action. Many concepts leveraged in authentication environments may be utilized in authorization environments, and vice versa. User location may be leveraged as one of the factors in a multi-factor authentication environment.

SUMMARY

As disclosed herein, a computer implemented method for managing access requests based on user device location includes receiving a user initiated access request from a first device of the user, receiving location data of the first device, requesting attestation of a registered device of the user from a trusted geocoded device, receiving an attestation token for the registered device of the user from the trusted geocoded device, wherein the attestation token includes location data for the registered device, comparing the received location data of the first device to the location data of the registered device, and issuing an authentication status based on the comparison of the received location data of the first device to the determined location data of the second device of the user. A computer program product and computer system corresponding to the method are also disclosed.

DETAILED DESCRIPTION

Certain applications, systems, and data classifications may require that access is restricted to a specific geography.

For example, some types of federal data must be hosted within the country of origin and can only be accessed from within said country. The most common methods for understanding where a user is located when accessing applications or systems include using IP address or GPS location provided by a phone and passed in. If someone is using a virtual private network (VPN), the IP address is assigned to them by the VPN when the user connects and reflects the region where the VPN is located. For example, if a user is traveling outside the United States, but is using a U.S. VPN, the user is assigned a U.S. IP address, thus making them appear to be inside the United States. GPS coordinates can also be "replayed" to spoof different locations, thereby providing inaccurate location information. In many cases, existing methods for location verification either use a weak approximation of a location or implicitly trust location data provided by an agent attempting access. Some embodiments of the present invention include a method for independently corroborating a registered device with a trusted location and time. Some embodiments of the present invention additionally enable location attestation and confirmation for a device without requiring a user to provide locational access to services that wouldn't typically require location access.

Figure 1:
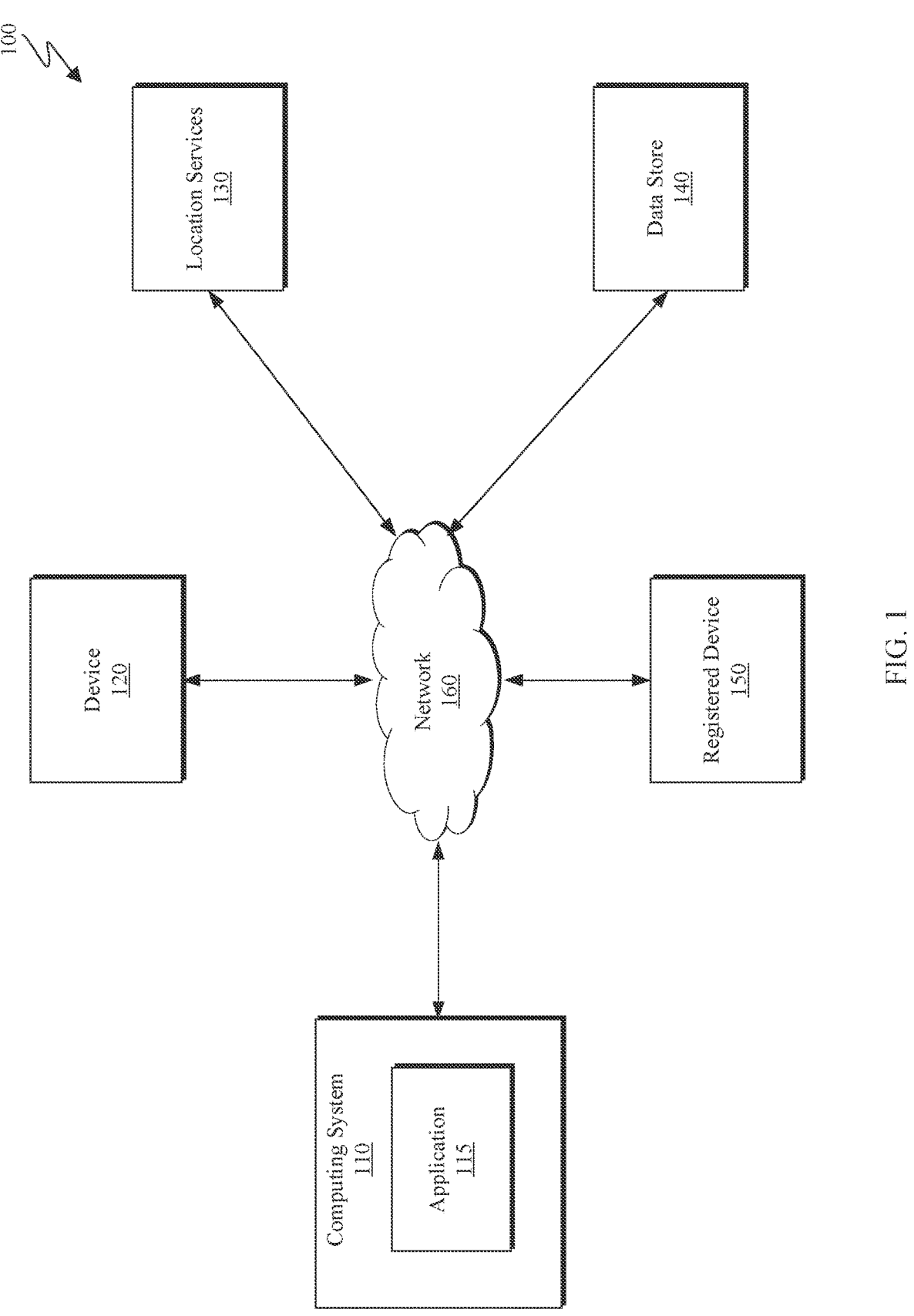
FIG. 1 is a block diagram depicting a location based attestation system in accordance with an embodiment of the present invention.

FIG. 1 is a block diagram depicting a location based attestation system 100 in accordance with an embodiment of the present invention. As depicted, location based attestation system 100 includes computing system 110, device 120, location services 130, data store 140, registered device 150, and network 160. FIG. 1 provides only an illustration of one implementation and does not imply any limitations regarding the environments in which different embodiments may be implemented. Many modifications to the depicted environment may be made by those skilled in the art without departing from the scope of the invention as recited by the claims.

Computing system 110 can be a desktop computer, a laptop computer, a specialized computer server, or any other computer system known in the art. In some embodiments, computer system 110 represents a computer system utilizing clustered computers to act as a single pool of seamless resources. In general, computing system 110 is representative of any electronic device, or combination of electronic devices, capable of receiving and transmitting data, as described in greater detail with regard to FIG. 4. Computing system 110 may include internal and external hardware components, as depicted and described in further detail with respect to FIG. 4.

As depicted, computing system 110 includes application 115. Application 115 may be configured to execute a location based attestation method, such as location based attestation method 200 as described with respect to FIG. 2. Application 115 may be further configured to manage access to data store 140. While the depicted embodiment depicts application 115 as being hosted on computing system 110, it should be appreciated that an instance of the application may also exist on device 120, such that a user may attempt to access data managed by computing system 110, such as controlled data held in data store 140, via its own instance of the application.

Device 120 can be a desktop computer, a laptop computer, a specialized computer server, or any other computer system known in the art. In some embodiments, device 120 represents a computer system utilizing clustered computers to act as a single pool of seamless resources. In general, device 120 is representative of any electronic device, or combination of electronic devices, capable of receiving and transmitting data, as described in greater detail with regard to FIG. 4.

With respect to a preferred embodiment of the present invention, device 120 is a mobile device.

Location services 130 may be any service or services capable of identifying a device's location. In some embodiments, location services 130 are configured to provide IP addresses corresponding to monitored devices. Location services 130 may be configured to provide GPS information corresponding to monitored devices. In at least some embodiments, location services 130 correspond to locator services capably of identifying cell towers or other network structures to which a device connected to initiate an access request. Location services 130 may be configured to provide a location token to a user's device, wherein the location attestation token is configured for location attestation. In at least some embodiments, the location attestation token is collected by the user via a personal device (such as device 120) from a nearest so-called "beacon service". A "beacon service" as used herein refers to any location associated with location services 130 capable of providing the user and/or device 120 with a location attestation token. In at least some embodiments, location services 130 are configured to verify that the location attestation token was "picked up" from an allowable location with respect to the user's data access attempt; since the token will be provided by the nearest beacon service, the location of said beacon service accounts generally for the location of the user's device at the time of the request. In general, location services 130 are configured to identify a location corresponding to a device at the time of an access request, and provide said identified location to application 115.

Data store 140 may be configured to store received information and can be representative of one or more databases that give permissioned access to computing system 110. In general, data store 140 can be implemented using any non-volatile storage media known in the art. For example, data store 140 can be implemented with a tape library, optical library, one or more independent hard disk drives, or multiple hard disk drives in a redundant array of independent disk (RAID). Data store 140 may be configured to provide permissioned access to data, wherein said permissions are managed by computing system 110 and/or application 115.

Registered device 150 can be a desktop computer, a laptop computer, a specialized computer server, or any other computer system known in the art. In some embodiments, registered device 150 represents a computer system utilizing clustered computers to act as a single pool of seamless resources. In general, registered device 150 is representative of any electronic device, or combination of electronic devices, capable of receiving and transmitting data, as described in greater detail with regard to FIG. 4. With respect to a preferred embodiment of the present invention, registered device 150 is a mobile device. In some embodiments, registered device 150 and device 120 are the same device. In such embodiments wherein registered device 150 and device 120 are the same device, it should be appreciated that any instance of application 115 on device 120 would obviously also exist on registered device 150.

Network 160 can be, for example, a local area network (LAN), a wide area network (WAN) such as the Internet, or a combination of the two, and include wired, wireless, or fiber optics connections. In general, network 160 can be any combination of connections and protocols that will support communications between any of computing system 110, device 120, location services 130, data store 140, and registered device 150. While the depicted embodiment of location based attestation system 100 depicts a single network 160 supporting communications between the various components, it should be appreciated that the components of location based attestation system 100 may utilize different networks to communicate, and network 160 is singularly depicted to be representative of any combination of networks facilitating communication within the system. With respect to some embodiments of the present invention, network 160 corresponds to a cellular network or combination of cellular networks. In a cellular network, an area serviced by the network is divided into cells of conventional shapes, and the cells are assigned multiple frequencies which have a corresponding cell site (transmitting tower or base station). Radio waves are used to transfer signals to and from cellular devices. The cell sites are connected to telephone exchanges (or switches), which are in turn connected to a public telephone network. The cell site to which a cellular device connects may provide location information corresponding to the cellular device.

Figure 2:
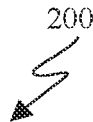
FIG. 2 is a flowchart diagram depicting a location based attestation method in accordance with an embodiment of the present invention.
Figure 2:
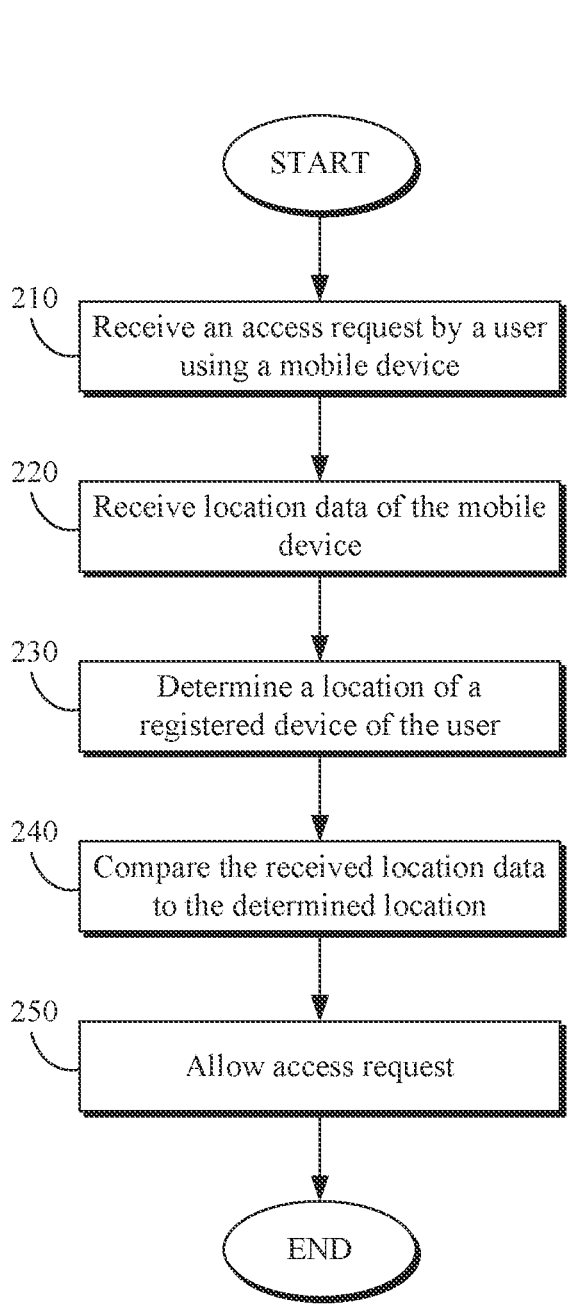

FIG. 2 is a block diagram depicting a location based attestation method 200 in accordance with an embodiment of the present invention. As depicted, location based attestation method 200 includes receiving (210) an access request by a user using a mobile device, receiving (220) location data of the mobile device, determining (230) a location of a registered device of the user, comparing (240) the received location data to the determined location, and allowing (250) the access request. Location based attestation method 200 may enable controlled access to restricted documents or data on the basis of a user's current location adhering to one or more allowable locations.

Receiving (210) an access request by a user using a mobile device may include receiving a user initiated request to access location restricted data. In at least some embodiments, receiving (210) an access request by a user using a mobile device includes the user logging into an application configured to gatekeep access to the location restricted data. In at least some embodiments, receiving (210) an access request by a user includes prompting the user to allow the application to access the user's location via the mobile device. In yet other embodiments, the application may frontload the request for access to the user's location upon installation, thereby foregoing the need to request the user's permission upon each use. Receiving (210) an access request by a user using a mobile device may include receiving a user's credentials associated with an application through which location restricted data is available. In at least some embodiments, receiving (210) an access request by a user using a mobile device includes requiring the user to complete a 2-factor authentication (2FA) methodology. Receiving (210) an access request by a user may additionally include receiving a request to a location service for a location attestation token. The location attestation token may be issued by a nearest beacon service associated with the location service. In general, receiving (210) an access request by a user using a mobile device includes receiving any indication of a user attempting to access location restricted data managed by the application.

Receiving (220) location data of the mobile device may include receiving any data capable of indicating a current location corresponding to the mobile device. In some embodiments, receiving (220) location data of the mobile device may include prompting the user, via an application of the mobile device, to allow the application to access the mobile device's location services. Receiving (220) location data of the mobile device may include receiving an IP location corresponding to the access attempt made via the mobile device. In at least some embodiments, receiving (220) location data of the mobile device may include determining whether the received location data of the mobile device corresponds to a location that falls within the allowable confines for access to the data. In such embodiments, receiving (220) location data of the mobile device may include rejecting the access request upon determining that the location of the mobile device does not fall within the allowable confines for access to the data. In at least some embodiments, receiving (220) location data of the mobile device includes receiving a location attestation token issued by a nearest beacon service associated with the location service at the time of the mobile device's access request. An attestation token (sometimes referred to as an entity attestation token or EAT) is a small blob of data that is encoded and cryptographically signed to issue secure validation of the corresponding entity's asserted identity and location information.

Determining (230) a location of a registered device of the user may include identifying a registered device associated with the user. In at least some embodiments, the registered device is associated with the credentials utilized by the user to access the application and request access to the controlled data. Determining (230) a location of a registered device of the user may include sending a request to a cellular locator service to determine the location of the registered device of the user. The cellular locator service may provide a confirmation that the cellular device indeed connected to a cell tower within a defined proximity of the location passed into the location authentication services. In other embodiments, the cellular locator may simply provide an indication of the tower via which the access attempt was transmitted, and the verification of the location/proximity of the tower relative to the access request may be left to the application. Determining (230) a location of a registered device of the user may include determining whether the determined location falls within the allowable confines for access to the data. In such embodiments, determining (230) a location of a registered device of the user additionally includes rejecting the access request upon determining that the location of the registered device does not fall within the allowable confines for access to the data. Determining (230) a location of a registered device of the user may include connecting to cell carrier networks to obtain real-time cell phone location data from nearby cell towers to identify the current location of the registered device.

In at least some embodiments, determining (230) a location of a registered device of the user includes relying on a network of trusted geocoded fixed devices to attest for the location of a device. Trusted geocode fixed devices may include cell towers or beacons. In at least some embodiments, these fixed devices will only provide attestation for devices whose presence can be verified through local phenomena, such as a connection to one or more local towers. Other embodiments include determining (230) the location of the registered device according to its connection to local BTLE (Bluetooth Low Energy) towers. In at least some embodiments, determining (230) a location of a registered device of the user may include determining that the device's location may not be identifiable within a certain margin of error, and subsequently indicating that the device's location cannot be determined.

In at least some embodiments, determining (230) a location of a registered device of the user includes identifying a trusted geocoded fixed device closest to the mobile device's location. The trusted geocoded fixed device may be configured to provide an attestation token which includes a confirmation of the registered device's adherence to one or more current location requirements. By allowing the trusted geocoded fixed device to simply provide an attestation token indicating locational adherence, the user can have the validity of their access attempt confirmed without necessarily allowing the application itself to have access to the registered device's specific location information. In other words, utilizing trusted geocoded fixed devices to provide location attestation tokens enables such devices, which already have access to some level of location information for a user device, to provide location attestation/confirmation relative to the user device without requiring that the user allows an additional service to utilize locational services in the background of their registered device.

Comparing (240) the received location data to the determined location may include determining whether the received location data as provided by the mobile device matches the determined location as identified with respect to the registered device. For example, comparing (240) the received location data to the determined location may include determining whether a location indicated by a received IP address with respect to the mobile device matches the determined location of the registered device. In embodiments wherein location is determined according to GPS information, comparing (240) the received location data to the determined location may include determining whether the location indicated by the GPS information matches the determined location of the registered device. In general, comparing (240) the received location data to the determined location includes determining whether the location of the registered device matches the supposed location of the mobile device. Comparing (240) the received location data to the determined location may additionally include determining whether the determined location corresponds to a location within the allowable confines for access to the data. Comparing (240) the received location data to the determined location may include rejecting the access request upon determining the received location data does not match the determined location. In embodiments in which a location attestation token has been issued, comparing (240) the received location data to the determined location may include comparing the location of the beacon service which issued the location attestation token to the location of the registered device. In at least some embodiments, comparing (240) the received location data to the determined location includes verifying the validity and authenticity of a location attestation token provided by the mobile device indicating its location.

Allowing (250) the access request may include giving the mobile device permissioned access to the requested data or data source. In at least some embodiments, allowing (250) the access request includes providing a one-time passcode (OTP) to the registered device of the user, wherein the OTP allows the user to access the requested data or data store. Allowing (250) the access request may include leveraging a multifactor authentication service for managing the OTP and granting access. In at least some embodiments, allowing (250) the access request includes receiving an indication from the location services that the location comparison was confirmed and that the determined location matched the received coordinates for the mobile device. In general, allowing (250) the access request includes any mechanism for enabling the requesting user to access the requested data or data source.

While the described embodiment of location based attestation method 200 in FIG. 2 refers to a mobile device initiating an access request and a registered device being used to attest the user's location, it should be appreciated that embodiments exist in which the mobile device is a registered device, and the access attempt is made by a device not necessarily considered mobile (such as a laptop, desktop computer, etc.). The mobile device nomenclature is utilized throughout the FIG. 2 description, but is not intended to be limiting, and should not be taken to imply that only mobile devices may initiate the access request.

Figure 3:
FIG. 3 is a dataflow diagram depicting data transfer within a location based attestation system in accordance with an embodiment of the present invention.
Figure 3:
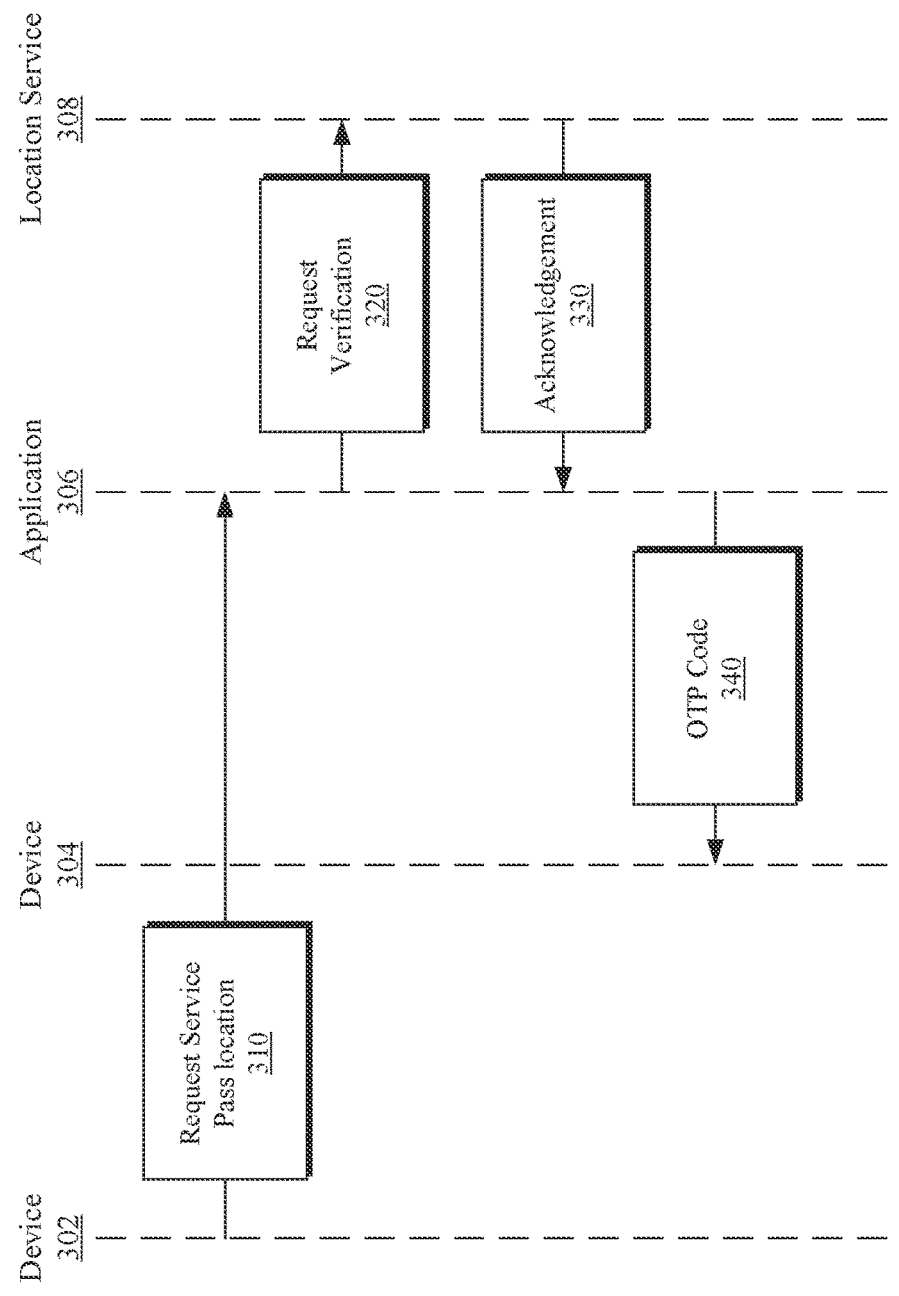

FIG. 3 is a dataflow diagram 300 depicting data transfer within a location based attestation system in accordance with an embodiment of the present invention. As depicted, dataflow diagram 300 includes a series of data transfers and requests occurring between a device 302, a device 304, an application 306, and a location service 308. As depicted, the data transfers include requesting access to a service and passing location (310), requesting verification (320), acknowledgement (330), and transmitting a one time passcode (OTP) (340). As indicated, the passage of time with respect to the data transfer operations is depicted from top to bottom, such that the first events to occur are depicted towards the top, and a given item occurs prior to the items below it, and after the items above it.

As depicted, dataflow begins with device 302 initiating a service request to application 306 (step 310). The service request may correspond to a data access request or a request to access or utilize a service requiring location attestation. As depicted, device 302 may also provide its own location data in combination with the service request. In at least some embodiments, the location data may be provided in the form of IP address data. Location data may also include GPS data. In general, location data may include any combination of data elements capable of describing/defining the device's location. The service request may include an indication of the user or an associated user profile such that the verification components downline can more easily identify a registered device for location attestation. The service request may initially include a request for a location attestation token. Generally, device 302 may be referred to as an initiating device, or a user's mobile device as discussed with respect to FIG. 2.

Subsequent to the service request made from device 302 to application 306, application 306 requests location verification from location service 308 (step 320). Application 306 may request that location service 308 ascertain the location of a registered device. Location service 308 may be configured to issue a location attestation token to device 302. In at least some embodiments, location service 308 utilizes beacon services to issue location attestation tokens to nearby devices. In such embodiments, location service 308 may be configured to identify the location of a beacon service which issued a location attestation token to device 302. In at least some embodiments, application 306 provides user profile information corresponding to the service request made from device 302 to application 306. Application 306 may additionally provide device 302's location information to location service 308, such that location service 308 can compare device 302's location information to location information corresponding to a registered device. Location service 308 may be configured to identify the location of such a registered device and determine whether device 302's location information falls within a predefined minimum acceptable distance or radius of the registered device. For example, if application 306 includes a configuration that a device must fall within X miles (or feet, yards, any appropriate unit of measurement), location service 308 determines whether device 302's location information indicates its presence is within an X-mile radius of the registered device. Generally, location service 308 is configured to execute a comparison between the location of device 302 and the location of the registered device.

Responsive to comparing the location of device 302 to the location of the registered device, location service 308 issues an acknowledgement back to application 306 that the location verification has been completed (step 330). The acknowledgement provided by location service 308 includes an indication of whether or not the location of device 302 matches the location of the registered device. If the acknowledgement indicates that the locations do not match, application 306 proceeds by denying the service request (not pictured). In such embodiments, application 306 may provide a denial notification to either of device 304 or device 302. If the acknowledgement indicates that the locations indeed do match, application 306 proceeds by providing a one time passcode to device 304. The one time passcode may provide access to the requested service via an authentication form via which the user must submit the one time passcode.

Figure 4:
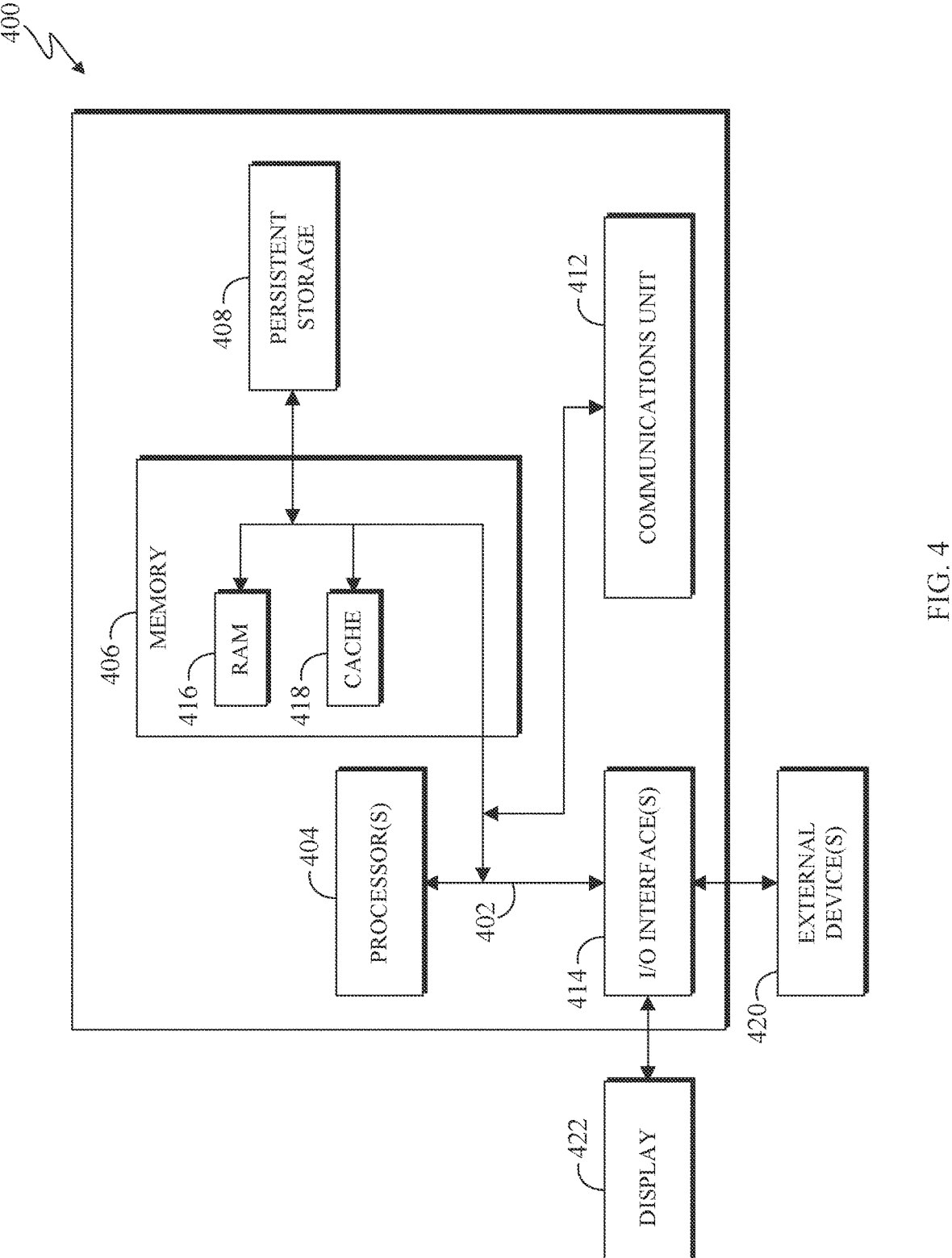
FIG. 4 is a block diagram of components of a computing system in accordance with an embodiment of the present invention.

FIG. 4 depicts a block diagram of components of computing system 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
receiving a user initiated access request from a first device of a user;
receiving an attestation token of the first device, wherein the attestation token is issued to the first device by a beacon service;
requesting, with the received attestation token of the first device, location verification from a location service;
receiving an acknowledgment from the location service based on the location service comparing a location of the first device based on the attestation token of the first device to a determined location of a registered device based on location of a trusted geocoded device verifying local presence of the registered device, wherein the registered device is different from the first device; and
providing a one time passcode (OTP) to the registered device in response to the acknowledgement, wherein the OTP allows the user access associated with the user initiated access request.

2. The computer implemented method of claim 1, wherein the attestation token comprises data that is encoded and cryptographically signed to issue secure validation of a corresponding entity's asserted identity and location information.

3. The computer implemented method of claim 1, wherein comparing the location of the first device to the determined location of the registered device comprises verifying validity and authenticity of the attestation token indicating the location of the first device.

4. The computer implemented method of claim 1, wherein comparing the location of the first device to the determined location of the registered device includes determining whether the location of the first device falls within a predefined acceptable radius with respect to the determined location of the registered device.

5. The computer implemented method of claim 1, wherein the trusted geocoded device is a cell tower of a cellular network.

6. The computer implemented method of claim 1, further comprising prompting the user to identify a registered device whose location will be verified in accordance with the user initiated access request.

7. A computer program product comprising:
one or more computer readable storage media and program instructions stored on the one or more computer readable storage media, the program instructions comprising instructions to:
receive a user initiated access request from a first device of a user;
receive an attestation token of the first device, wherein the attestation token is issued to the first device by a beacon service;
request, with the received attestation token of the first device, location verification from a location service;
receive an acknowledgment from the location service based on the location service comparing a location of the first device based on the attestation token of the first device to a determined location of a registered device based on location of a trusted geocoded device verifying local presence of the registered device, wherein the registered device is different from the first device; and
provide a one time passcode (OTP) to the registered device in response to the acknowledgement indicating a match between the location of the first device and the location of the registered device, wherein the OTP allows the user access associated with the user initiated access request.

8. The computer program product of claim 7, wherein the program instructions further comprise instructions to:
responsive to the acknowledgement indicating the location of the first device and the location of the registered device do not match, deny the user initiated access request.

9. The computer program product of claim 7, wherein the program instructions further comprise instructions to prompt the user to identify a registered device whose location will be verified in accordance with the user initiated access request.

10. The computer program product of claim 7, wherein the program instructions to compare the location of the first device to the determined location of the registered device comprise instructions to determine whether the location of the first device falls within a predefined acceptable radius with respect to the determined location of the registered device.

11. The computer program product of claim 7, wherein the trusted geocoded device is a cell tower of a cellular network.

12. A computer system comprising:
one or more computer processors;
one or more computer-readable storage media; and
program instructions stored on the computer-readable storage media for execution by at least one of the one or more processors, the program instructions comprising instructions to:
receive a user initiated access request from a first device of a user;
receive an attestation token of the first device, wherein the attestation token is issued to the first device by a beacon service;

request, with the received attestation token of the first device, location verification from a location service;

receive an acknowledgment from the location service based on the location service comparing a location of the first device based on the attestation token of the first device to a determined location of a registered device based on location of a trusted geocoded device verifying local presence of the registered device, wherein the registered device is different from the first device; and provide a one time passcode (OTP) to the registered device in response to the acknowledgement indicating a match between the location of the first device and the location of the registered device, wherein the OTP allows the user access associated with the user initiated access request.

13. The computer system of claim 12, wherein the program instructions further comprise instructions to prompt the user to identify a registered device whose location will be verified in accordance with the user initiated access request.

14. The computer system of claim 12, wherein the program instructions further comprise instructions to:

responsive to the acknowledgement indicating the location of the first device and the location of the registered device do not match, deny the user initiated access request.

15. The computer system of claim 12, wherein the program instructions to compare the location of the first device to the determined location of the registered device comprise instructions to determine whether the location of the first device falls within a predefined acceptable radius with respect to the determined location of the registered device.

16. The computer system of claim 12, wherein the trusted geocoded device is a cell tower of a cellular network.

* * * * *